United States Patent [19]
Yosefi

[11] Patent Number: 5,420,702
[45] Date of Patent: * May 30, 1995

[54] METHOD FOR PREPARING POLYCHROMATIC PRINTING PLATES

[75] Inventor: Hanan Yosefi, Rishon LeZion, Israel

[73] Assignee: Scitex Corporation Ltd., Herzlia Bet, Israel

[*] Notice: The portion of the term of this patent subsequent to May 12, 2009 has been disclaimed.

[21] Appl. No.: 215,546

[22] Filed: Mar. 22, 1994

Related U.S. Application Data

[63] Continuation of Ser. No. 843,338, Feb. 28, 1992, Pat. No. 5,323,248, which is a continuation of Ser. No. 545,805, Jun. 29, 1990, Pat. No. 5,113,249.

[30] Foreign Application Priority Data

Mar. 2, 1990 [IL] Israel ......................................... 93607

[51] Int. Cl.⁶ ..................... H04N 1/23; H04N 1/46; H04N 1/50
[52] U.S. Cl. .................................... 358/501; 358/504; 358/515; 358/540; 358/299
[58] Field of Search ............... 358/504, 515, 501, 518, 358/532, 540, 299

[56] References Cited
U.S. PATENT DOCUMENTS

4,583,116  4/1986  Hennig et al. ................ 358/518
5,113,249  5/1992  Yosefi ............................ 358/515

*Primary Examiner*—Scott A. Rogers
*Attorney, Agent, or Firm*—Benjamin J. Barish

[57] ABSTRACT

A method of processing a file of recorded color separation values of color elements for use in preparing polychromatic printing plates in order to reduce or eliminate defects caused by misregistration by printing, includes the steps: (a) defining a plurality of predetermined color types; (b) identifying the color pairs where there is a change in color between adjacent color elements; and (c) for each color pair, determining whether or not to make a frame according to first predetermined criteria based on specific combination of color types in the pair, and then according to second predetermined criteria based on the difference in luminance between corresponding color separations in the respective pair. For those color pairs in which a frame is to be generated, the location of the frame is determined according to third predetermined criteria based on specific combinations of color types in the pair, and then according to fourth predetermined criteria based on the sum of the luminances of each color in the color pair.

8 Claims, 12 Drawing Sheets

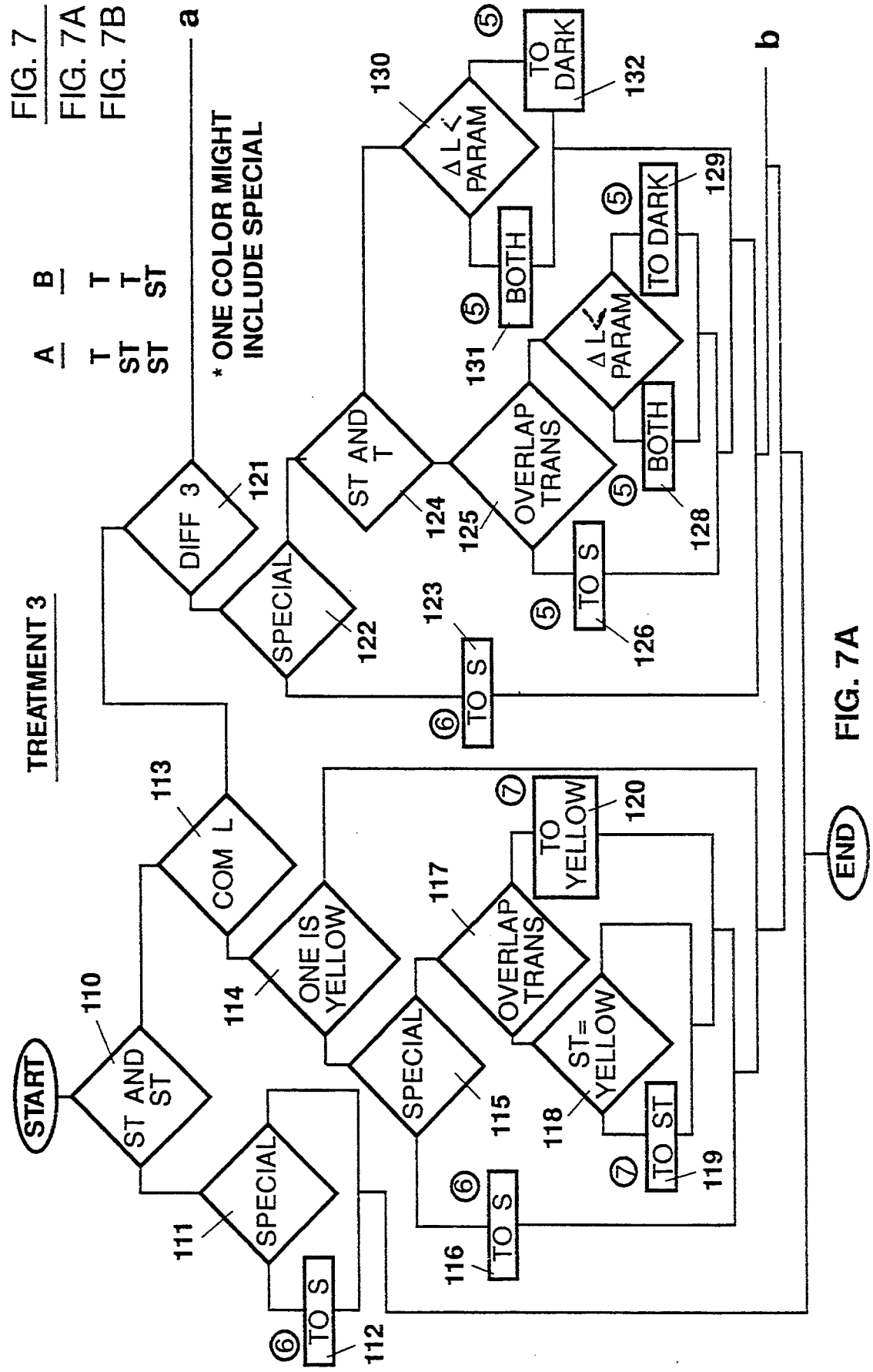

METHOD FOR PREPARING POLYCHROMATIC PRINTING PLATES

RELATED APPLICATION

The present application is a continuation of application Ser. No. 07/843,338, filed Feb. 28, 1992 which is a continuation of application Ser. No. 07/545,805, filed Jun. 29, 1990, now U.S. Pat. No. 5,113,249, Ser. No. 843,338 is now U.S. Pat. No. 5,323,248.

FIELD AND BACKGROUND OF THE INVENTION

The present invention relates to the field of preparing polychromatic printing plates, and particularly to a method for reducing or eliminating defects caused by misregistration of the polychromatic printing plates.

In polychromatic printing using subtractive color mixing, an image is reproduced by three or four printing inks which are printed on top of each other. Thus, in order to produce the spectrum of colors, the appropriate amounts of the three or four printing inks for printing cyan (C), magenta (M), and yellow (Y), and frequency black (K), are placed upon each image point, preferably in that order. The printing ink may include other colors, such as gold, silver, green, etc., called "special" colors. The amounts of the printing inks which are determined by printing ink signals, are defined as color separation signals.

Misregistration of polychromatic printing plates does not occur when printing a regular scanned picture area, because the pictures are scanned through an unsharp mask and therefore the scanner normally blurs the edges between different colors. However, misregistration problems can occur in the press process and is particularly noticeable between flat areas, or combinations of flat areas and picture areas, in some of the separations. Flat areas in Color Electronic Prepress Systems (CEPS) contain the line work (i.e., work in which there are running lengths of color elements of the same value), as distinguished from continuous tone areas (areas in which the color elements change in value from one element to the next).

For this reason, most of the EPC systems today have a "frames" process, in which the system generates a frame between bordering colors that were predefined by the user. This requires the user to define a plurality of parameters, such as: the bordering colors to be framed, the direction of framing for each pair, and the percentages in each color separation that will create the new color. Such a procedure requires not only considerable time to execute, but also considerable expertise and experience by the operator and is open to human errors and misjudgements.

One method in use for generating the frames automatically frames each color area according to the color separations that it contains. Thus, the luminance (i.e., darkness) of each color separation is determined, and the framing is effected, according to the color separation having the highest luminance, the other separations being shrunk with respect to the corresponding separations of the other color. Such a method, however, is not entirely satisfactory since it does not take into consideration the bordering colors of each color pair, or the percentages in each separation. For example, if one color consists of the separations cyan and magenta, and the other color consists of cyan and black, when the printing is effected according to the sequence C, M, Y, K, a white line will occur in case of misregistration between the magenta and the black.

Another method is described in Hennig et al. U.S. Pat. 4,583,116. In this system, the four process color separations (C, M, Y, K) are weighted by multiplying the color area of each separation by its respective darkness coefficient, and the darker separation in each color area defines the darkness of the color area. The framing is then effected with respect to all the color pairs by spreading the lighter (lower luminance) separations from the lighter area (other than the darkest determining the darker areas) towards the corresponding separations of the darker (higher luminance) area. However, this method also does not always produce satisfactory results because in many case the overall darkness of a color is significantly influenced not only by the darkest separation but also by the other separations of the respective color.

OBJECTS AND SUMMARY OF THE INVENTION

An object of the present invention is to provide an improved method and system for preparing polychromatic printing plates in order to reduce or eliminate defects caused by misregistration of the plates.

According to the present invention, there is provided a method of processing a file of recorded color separation values of color elements for use in preparing polychromatic printing plates in order to reduce or eliminate defects caused by misregistration by printing, comprising the steps: (a) defining a plurality of predetermined color types; (b) identifying the color pairs where there is a change in color between adjacent color element; and (c) for each color pair, determining whether or not to make a frame according to first predetermined criteria based on specific combination of color types in the pair, and then according to to second predetermined criteria based on the difference in luminance between corresponding color separations in the respective pair.

According to further features in the described preferred embodiment of the invention, for those color pairs in which a frame is to be generated, the location of the frame is determined according to third predetermined criteria based on specific combinations of color types in the pair, and then according to fourth predetermined criteria based on the sum of the luminances of each color in the color pair.

For those color pairs in which a frame is to be generated according to the second criteria, the frame is generated in the direction of the color having the higher sum of luminances. More particularly, this is done by spreading the darker separations of the lighter color in the direction of the darker color.

According to further features in the described preferred embodiment, a frame is not generated when the common luminances in the same separations between bordering process colors that are not black are above a predetermined value.

The main criteria, in the described preferred embodiment of the invention described below, as to when a frame is generated, the location of the frame, and the color of the frame, are as follows. When:

(1) one color of the pair is defined as being a white frame, the frame is generated towards the other color of the pair, and the color of the frame is zero coverage in the process colors;

(2) one color of the pair is a base color and also contains a process color, and the other is a non-base color, the frame is generated towards the base color, and the frame color is the original color without the base;

(3) one color of the pair is black and the other is a special, the frame is generated towards the darker color, and the color of the frame is the combination of black and special;

(4) the two colors of the pair are specials not to be printed with the same ink, the frame is generated towards the darker color, and the color of the frame is a combination of the two specials;

(5) one color of the pair is a special color, the other is a special plus a process color, and the darkest special separations of the two colors are not to be printed with the same ink, the frame is generated towards the color having the darkest special separation, and the frame color is the darkest special separation plus the other separations of the second color;

(6) one color is a window, semi-tint or tint type, the other color is black, and at least one of the C, M, Y separations differs significantly in the two colors; the frame is generated towards the black; and the frame color is the black separation from the black color and the C, M, Y separations from the other color;

(7) one color of the pair is black and the other is a window, tint or semi-tint type, at least one of the C, M, Y separations differs significantly among the two colors, and one of the two bordering colors includes a special separation, the frame is generated towards the special; and the frame color is a combination of the special color and the process separations of the other color;

(8) one color of the pair is black and the other is of the window or semi-tint type, at least one of the C, M, Y separations differs significantly among the two colors, and there was an overlap transparent instruction, the frame is generated towards the semi-tint or window; and the frame color is the black separation from the black color, and the other separations from the other color;

(9) one color of the pair is of the window type and the other color is of the tint type, at least one of the tint C, M, Y separations is significantly darker from the other, and one color includes a special separation, the frame is generated towards the color including the special separation; and the frame color includes the special separation of the special color and other separations of the other colors;

(10) one color of the pair is of the window type, and the other is of the tint type, at least one of the tint C, M, Y separations is significantly darker than the other, and there was an overlap transparent instruction, the frame is generated towards the window type color; and the frame color is the darkest separation of both colors;

(11) one color of the pair is of the window type, and the other is of the tint type, at least one of the tint C, M, Y separations is significantly darker than the other, and the difference between the darkness of the color areas of the two colors is less than a defined parameter, one half of the frame is generated towards one color and the other half of the frame is generated towards the other color; and the frame color is the darkest separation of both colors;

(12) one color of the pair is of the window type and the other is of the tint type, and at least one of the tint C, M, Y separations is significantly darker than the other, but the difference between the darkness of the color areas of the two colors is more than a defined parameter, the frame is generated towards the tint type; and the frame color is the darkest separation of both colors;

(13) one color is of the window type and the other is tint considered as a yellow color area, and the tint includes a special, the frame is generated towards the special; and the frame color is the special separation from the special color and the other separations from the other color;

(14) one color of the pair is of the window type and the other is tint considered as a yellow color area, but the tint does not include a special, the frame is generated towards the tint; and the frame color is the CMK separations from the yellow color area and the yellow separation from the other color, plus the difference of percent between two yellow separations multiplied by a predetermined user-defined factor;

(15) both colors of the pair are of the semi-tint type and one includes a special separation, the frame is generated towards the color having the special separation; and the frame color is the special separations from the special color, and the other separations from the other color;

(16) one color of the pair is of the yellow area type and the other is of the semi-tint or tint type that includes a special separation, the frame is generated towards the color of the special separation; and the frame color is the special separations from the special color, and the other separations from the other color;

(17) one color is of the semi-tint type considered as a yellow area type, and the other is of the tint type, the frame is generated towards the semi-tint type; and the frame color is the C, M, K separations from the yellow area, and the Y separation from the other color, plus the difference of percent between two yellow separations multiplied by a predetermined user-defined factor;

(18) both colors of the pair are either of the tint or semi-tint type, at least two separations differ significantly in opposite directions, and one color includes a special separation, the frame is generated towards the color including the special separation; and the frame color is the special separations from the special color, and the other separations from the other color;

(19) one color of the pair is of the semi-tint type, and the other is of the tint type, at least two separations differ significantly in opposite directions, and an overlap transparent instruction was made, the frame is generated towards the semi-tint; and the frame color is the highest percentage in each separation, corresponding darker separations from the lighter area being reduced by the differences in percentage in the same separation between the lighter and darker areas multiplied by a factor;

(20) one color of the pair is of the tint or semi-tint type and the other is tint, at least two separations differ significantly in opposite directions, the common luminance is less than a predefined parameter, and the difference between the darkness of the color areas of the two colors is less than a defined parameter, one half the frame is generated towards one color, and the other one half frame is generated towards the other color; and the frame color is the highest percentage in each separation, corresponding darker separations from the lighter area being reduced by the difference in percentage in the corresponding separation between the lighter and darker area multiplied by a factor;

(21) one color of the pair is of the tint or semi-tint type, the other is tint, at least two separations differ significantly in opposite directions, the common luminance is less than a predefined parameter, and the difference between the darkness of the colors areas is more than a defined parameter, the frame is generated towards the darker color; and the frame color is the highest percentage in each separation, corresponding darker separations from the lighter area being reduced by the difference in percentage in the corresponding separation between the lighter and darker areas multiplied by a factor;

(22) one color of the pair includes a special separation, and the other is of the tint or semi-tint type, and the process color is darker than the color including the special separation, the frame is generated towards the process color; and the frame color is the special separations from the special color, and other separations from the other color;

(23) one color of the pair includes a special separation and the other is of the tint or semi-tint type, but the process color is not darker than the special color, the frame is generated in the direction of the special color; and the frame color is the special separations from the special color, and the other separations from the other color;

(24) one color of the pair is of the window type, and the other is of the special type, and it was not instructed to overlap transparent, the frame is generated towards the special type; and the frame color is the special separations from the special color, and other separations from the other color.

Other criteria may be provided in determining whether or not to frame, the location of the frame, and the color of the frame but the foregoing are the principal ones in the described preferred embodiment.

The method of the present invention thus systematically performs a series of checks on each color pair in order to determine whether or not to create a frame. As soon as a color pair matches a specific situation, a frame is generated of a frame color and direction according to the values of the color pair. The direction of the frame is towards the darker color area, i.e., towards the color with the higher luminance, called the reference or boundary color; and the frame color is always at least as dark, and usually darker, than the reference color from which it is created.

Accordingly, the invention provides a fully automatic framing system which obviates the need for the expertise and experience of the operator heretofore required to reduce defects caused by misregistration of the polychromatic printing plates. The system also relieves the operator of the considerable time heretofore required to perform such framing operations.

The invention also provides apparatus for processing a file of recorded separation values of color elements for use in making polychromatic printing plates in order to reduce or eliminate defects caused by misregistration of the plates.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF A PREFERRED EMBODIMENT

EPC Process for Preparing Polychromatic Printing Plates

Figure 1:
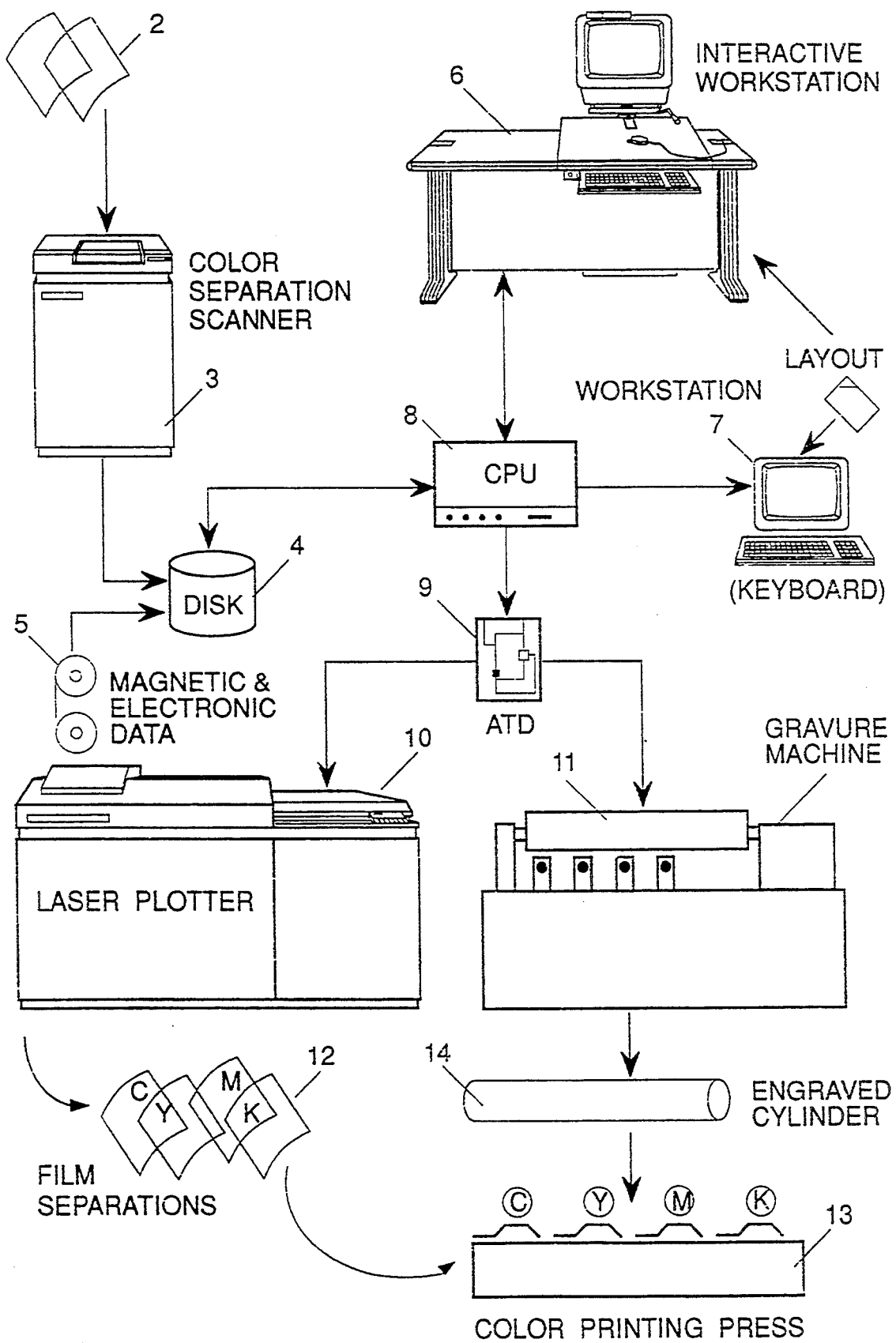
FIG. 1 pictorially illustrates an overall EPC process for preparing polychromatic printing plates in accordance with the present invention.

FIG. 1 illustrates an example of the overall EPC process for preparing polychromatic printing plates. Thus, the input to the process, as schematically indicated at 2, may be or include "originals" (i.e., transparencies), or "mechanicals" (i.e., black and white sheets illustrating the layout). The inputted data is scanned (block 3) for each original or mechanical and recorded in a disk 4. Other data, such as from a magnetic tape, may also be inputted, or may have been pre-recorded, in disk 4, as schematically shown at 5.

All the originals and mechanicals are then assembled into one layout at an interactive work station 6. This is done by feeding the data recorded on disk 4, as well operator-inputted data from a work station 7, via a central processor unit (CPU) 8, to the interactive work station 6. After the full layout is assembled, it is fed through the CPU 8 to an automatic framing system (AFS) 9, where the framing process, to be described below, is executed in order to reduce or eliminate defects caused by misregistration of the ultimately produced polychromatic printing plates.

After the framing process has been completed, the data is then recorded in a laser plotter 10 or a gravure printing machine 11, depending on the type of printing to be used. If a laser plotter is used, film separations are produced, as shown at 12, and then printed out as shown at 13; whereas if a gravure machine 11 is used, the information is utilized to engrave the cylinder, as shown at 14, and then printed out.

The Automatic Framing System

Figure 2:
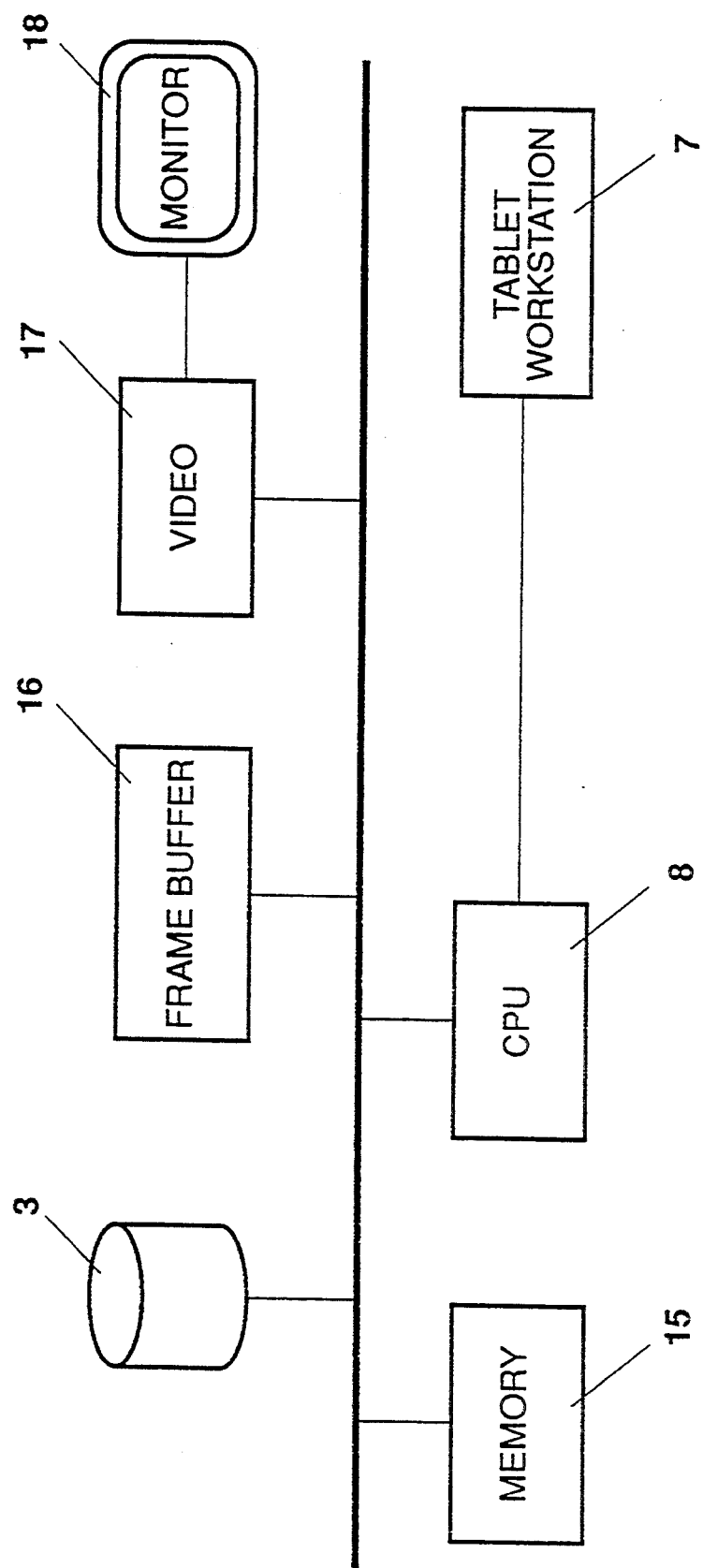
FIG. 2 is a block diagram illustrating the automatic framing system in the overall process of FIG. 1.

FIG. 2 is a block diagram illustrating the automatic framing system represented by block 9 in FIG. 1 in which frames are generated, where required, between color pairs in order to reduce or eliminate defects caused by misregistration of the polychromatic printing plates when printing the final copy.

Disk 4 has recorded thereon two files of color separation values. One file includes the color separation values of the flat areas or line work, namely those color elements of the same value for certain running lengths as recorded in the files this file serves as the overall mask and is sometimes referred to as the "mask file". The second file, referred to as the "continuous tone file", has recorded thereon the color separation values of color elements which change from one element to the next. The mask file is normally used for preparing the polychromatic printing plates, except where a color area is designated "transparent"; in such case the color separation values of the mask file are ignored, and the color separation values in the continuous tone file are used.

The files are organized in a plurality of horizontal lines of data. For example, each line of data may include about 3,000 color elements in each horizontal line, and there may be about 2,000 horizontal lines in a page.

The system reads each line, counts the color elements in the respective line, and identifies the color of each element by a number, all of which are recorded in memory 15 together with the line number. Each color element is compared with five bordering coloring elements (i.e., the three bordering elements in the previous line and the two adjacent ones in the same line) to determine whether there is a color change.

The system thus identifies the color pairs where there is a change in color between adjacent color elements. For each color pair, it determines, according to predetermined criteria, whether or not a frame is to be generated for the respective color pair. For those color pairs in which a frame is to be generated, the system determines, according to other predetermined criteria, the location and color separation values of the frame with respect to the two colors of the pair. Such locations and color separation values are recorded in a frame buffer 16. The recorded locations and color separation values of the frames are subsequently used, with the recorded separation values of the color elements, for preparing the polychromatic printing plates according to the overall process illustrated in FIG. 1.

The automatic printing system illustrated in FIG. 2 further includes a video unit 17 and a monitor unit 18 enabling the operator to monitor the results and to modify the results if necessary by inputting data via the work station input 7.

Process Flow Chart for the Automatic Framing System

Figure 3:
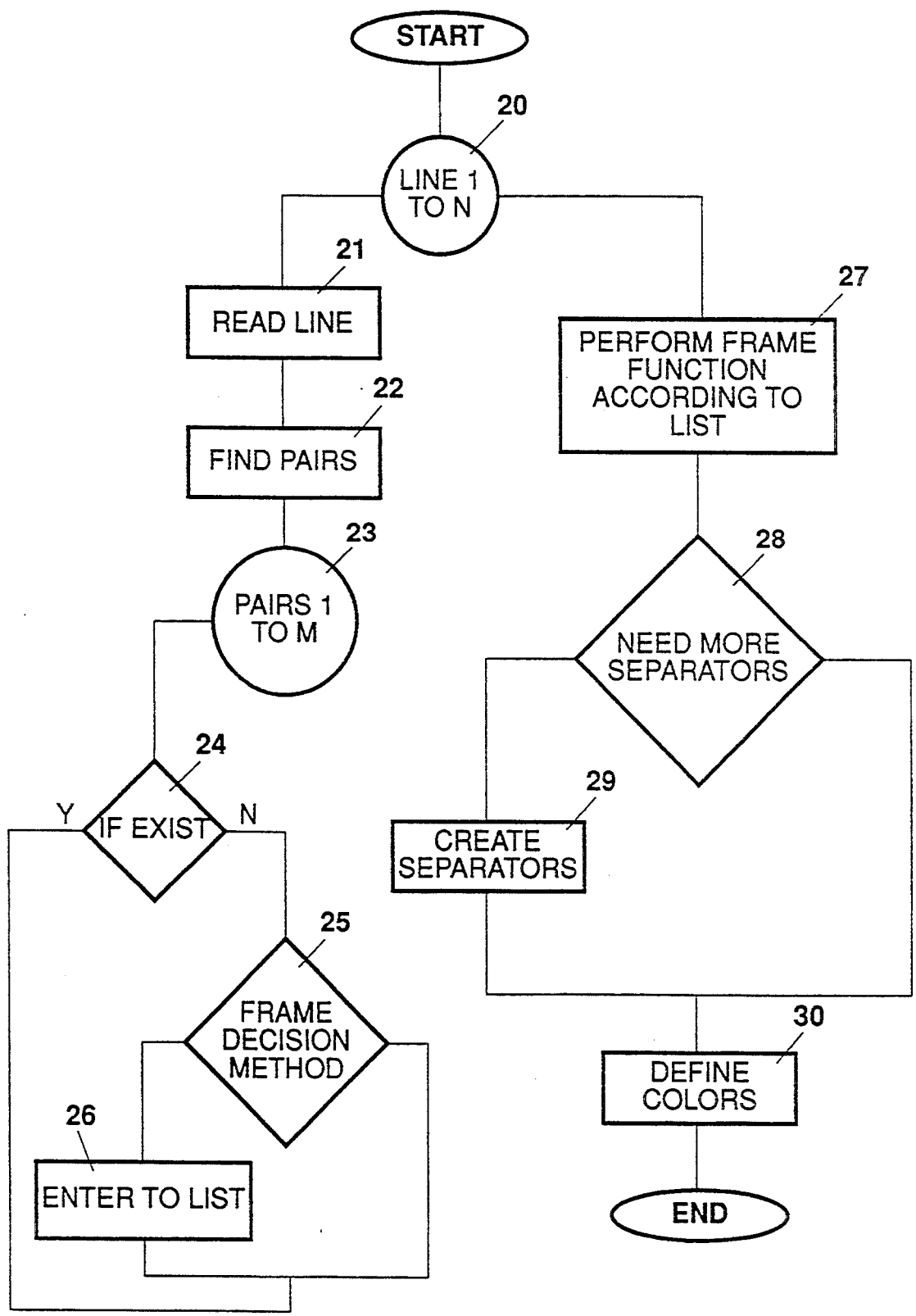
FIG. 3 is a flow chart illustrating the overall process of framing in the system of FIG. 2.

FIG. 3 more particularly illustrates the software-control process of the automatic framing system represented by block 9 in FIG. 1 and shown in the hardware block diagram of FIG. 2.

In the process flow chart of FIG. 3, circle 20 designates a loop in which the lines are read one after the other. For each read line (block 21), the color pairs are found (block 22) by identifying those where there is a change in color between adjacent color elements. Since the color pairs are found not only between color elements of the same line, but also between adjacent lines, the memory always retains three lines to enable pairs between lines to be compared.

The first time a particular pair is located, involving a change of one color (A) to another color (B), or of color B to color A, this is recorded in a table in the memory (15, FIG. 2), together with a predetermined value representing that pair. The predetermined value is determined according to the four color separations for each color.

Every color pair is recorded in the memory only once, and every subsequence recurrence of that particular pair is ignored at this stage. Thus, as each pair is identified, a loop is executed (circle 23) to determine whether that particular pair had been previously identified (block 24). If yes, nothing further occurs; but if not, a decision is made (block 25) whether that particular color pair is to be framed; and if so, it is entered in the frame list (block 26) stored in the frame buffer 16 (FIG. 2). Decision block 25 makes the following decisions with respect to each color pair:

(a) whether or not to generate a frame for that particular pair;

(b) if yes, in which direction to spread the color, i.e., the location of the color frame with respect to the two color elements of the color pair; and (c) the color separation values of the frame color.

Where special colors are to be printed, such as gold, silver, white base, etc., not identified by the C, M, Y, K separations), a further decision is made with respect to the special colors, i.e., whether or not to generate a frame, and if so, the direction and color of the frame.

It will thus be seen that the list prepared (block 26) as a result of the frame decisions in block 25 includes only the frames to be generated; where a color pair is not to generate a frame, it is not entered in this list.

After all the lines have thus been read (via loop 20), and the frame list prepared and stored in the frame buffer 16, the system then proceeds to perform the frame functions according to the list (block 27). That is, the previously-prepared files of the four color separations is modified according to the prepared list of the color pairs for generating frames. The so-prepared file is thus a combination of the scanned information and the frames to be generated. The file may also include other data inputted by the operator, e.g., special graphic shapes, background shading, etc., as well as text inputted from a front-end system, e.g., word processor, etc.

The operator also predefines the number of separations required for a particular job. For example, the specification may specify that a particular area will be of a special color, such as gold or silver, which cannot be produced by the normal four color separations. This would require the creation of a new color separation that will be printed with a specific ink to show the special color (e.g., gold or silver).

In the flow chart of FIG. 3, a decision is made (block 28) whether or not new color separations are required for the particular job; and if so, a new file is opened containing the same data as the original file, but the color values are defined differently to specify the special color (block 29). After all the required color separations are created, the color values in each color separation are defined (block 30), and this data is recorded with the other data for use in preparing the polychromatic printing plates.

Special Tables for Use in Making Frame Decisions

FIGS. 4–9 are flow charts illustrating the process for making the frame decisions represented by decision block 25 in FIG. 3. However, these decisions are based on pre-programmed data as appearing in the following Tables 1, 2 and 3.

TABLE I

| | | SEPARATIONS | | | | | | |
|---|---|---|---|---|---|---|---|---|
| PRIORITY | AREA TYPES | C | M | Y | B | S1 | S2 | REMARKS |
| 1 | BGB = Background | Any percentage and type | | | | | | Color area considered |

TABLE I-continued

| PRIORITY | AREA TYPES | SEPARATIONS | | | | | | REMARKS |
|---|---|---|---|---|---|---|---|---|
| | | C | M | Y | B | S1 | S2 | |
| | Base | | | | | | | as BG because it is defined as No Base Color. |
| 2 | S = Special | | | | | * | | The area will be printed with special ink |
| 2 | MS = Multi Special | | | | | * | * | The area will be printed with more than one special ink |
| 2 | SP = Special + Process | % | % | CT | % | * | | The area will be printed with a special ink on top of the process inks |
| 3 | K = Black | Any percentage and types | | | % | | | Percents in black are above a minumum defined |
| 4 | W = Window | CT | CT | CT | CT | | | CT in all separations |
| 4 | T = Tint | % | % | % | % | | | Flat area |
| 4 | BG = Background | — | — | — | — | | | Nothing is printed |
| 4 | ST = Semi-Tint | % | CT | % | CT | | | Some separations are flat and others CT. |

Other Terms:
L = Luminance - This is the amount of darkness/brightness of a separation and/or a color area.

TABLE II

| | Explanation to the Questions in the Charts |
|---|---|
| Diff 1 | At least one of the C,M,Y separation has to differ significantly. |
| Diff 2 | At least one of the Tint C,M,Y separations has to be darker significantly. |
| Diff 3 | At least two separations to differ significantly in opposite directions. |
| Dark | The sum of luminance of all separations in the Dark color is higher than the sum of Luminance of all separations of the other color. |
| LUMS = Opaque | The luminance of the special color is greater than the sum of luminance of C,M,Y,K that have 100 percents. |
| Yellow | If a color area had the folowing characteristics it is considered as "Yellow": 1. A very high percentage in the yellow separation. 2. The sum of luminance in the C,M.B separations is high. 3. The bordering color area is not a "Yellow". 4. There is at least one significantly diferent among the C,M,B separations of the bordering colors. |
| Com L | The sum of common Luminance in the same separations between the bordering colors is high. |
| Same Group | The system checks whether a two bordering special separations are going to be printed with the same ink. |
| Overlap Trans | A decision whether to always overlap color areas that contain a CT in one of their separations. |
| ΔL < Params | The difference between the darkness of color-areas A,B is less than a defined parameter. |
| LumA > LumB | the overall darkness of color A is greater than the overall darkness of color B. |
| Dark of A,B Same Group | The darkest separations of A and B are printed with the same ink. |

TABLE III

FRAME COLOR INSTRUCTION TABLE

1. Zero percents in all C, M, Y, B and special separations except in the special white if it exists.
2. All C, M, Y, B and special remain the same, the special White becomes zero percent.
3. Black separation percents from the Black Color. C, M, Y percentage from the other color.
4. Half the size of the frame to each direction Highest percentage in each separation. A special, if exist doesn't change.
5. Highest percentage in each separation. Adjacent separations from the lighter area are reduced by the difference of percentage between the lighter and darker area multiplied by a predetermined user-defined factor.
6. Special separations from "Special" color. Other separations from the other color.
7. C, M, B separations from the "Yellow" area, Y Separation from the other color, plus the difference of percent between two yellow separations multiplied by a predetermined user-defined factor.
8. C, M, Y, B from "Black" color area. Special separations from "Special color".
9. Special separations from "Special areas A and B".
10. The darkest special separation of the dark color area and the other special separations of the other color area.
11. All separations as the overlapped color plus the special of the other color area.

Table 1 identifies various area types and their order of precedence (hierarchy) in the frame decisions made in the flow charts of FIGS. 4–9. Thus, if the decision tree illustrated in the flow charts of FIGS. 4–9 determines that a particular color pair is in an area type of high priority, it makes its decision based on that area type, without checking further. Some of the area types are inputted by the operator, and others are inputted by the computer.

As shown in Table 1, the area type of highest priority is that designated NBC (No Base color). This area type is inputted by the operator with respect to all the areas including the background base color (e.g., white). An area defined as NBC may include any percentage and any type of color separations, including special colors.

The next order of priority of area types on Table 1 includes S (special), MS (multi-special) and SP (special plus process). These area types are also operator inputted and identify those areas where special color inks will be printed. Area S will be printed with a special ink;

area MS will be printed with more than one special ink; and area SP will be printed with a special ink on top of the process (CMYK) inks.

The area type of next priority is designated in Table 1 is K (black), namely an area in which the percent of black (K) separation is above a predetermined minimum percentage (e.g., 85%), regardless of the percentage of the other three color separations. Area K type is computer inputted.

The remaining areas W (window), T (tint), BG (background), and ST (semi-tint), are also computer inputted, and have the lowest priority in the frame decision making. An area is designated as W (window) when it has a continuous tone (CT) in all separations, as T (tint) when it has flat areas in all separations, as BG (background) when nothing is printed, and as ST (semi-tint) when some separations are flat and others are CT.

Figures 4, 4A, 4B:
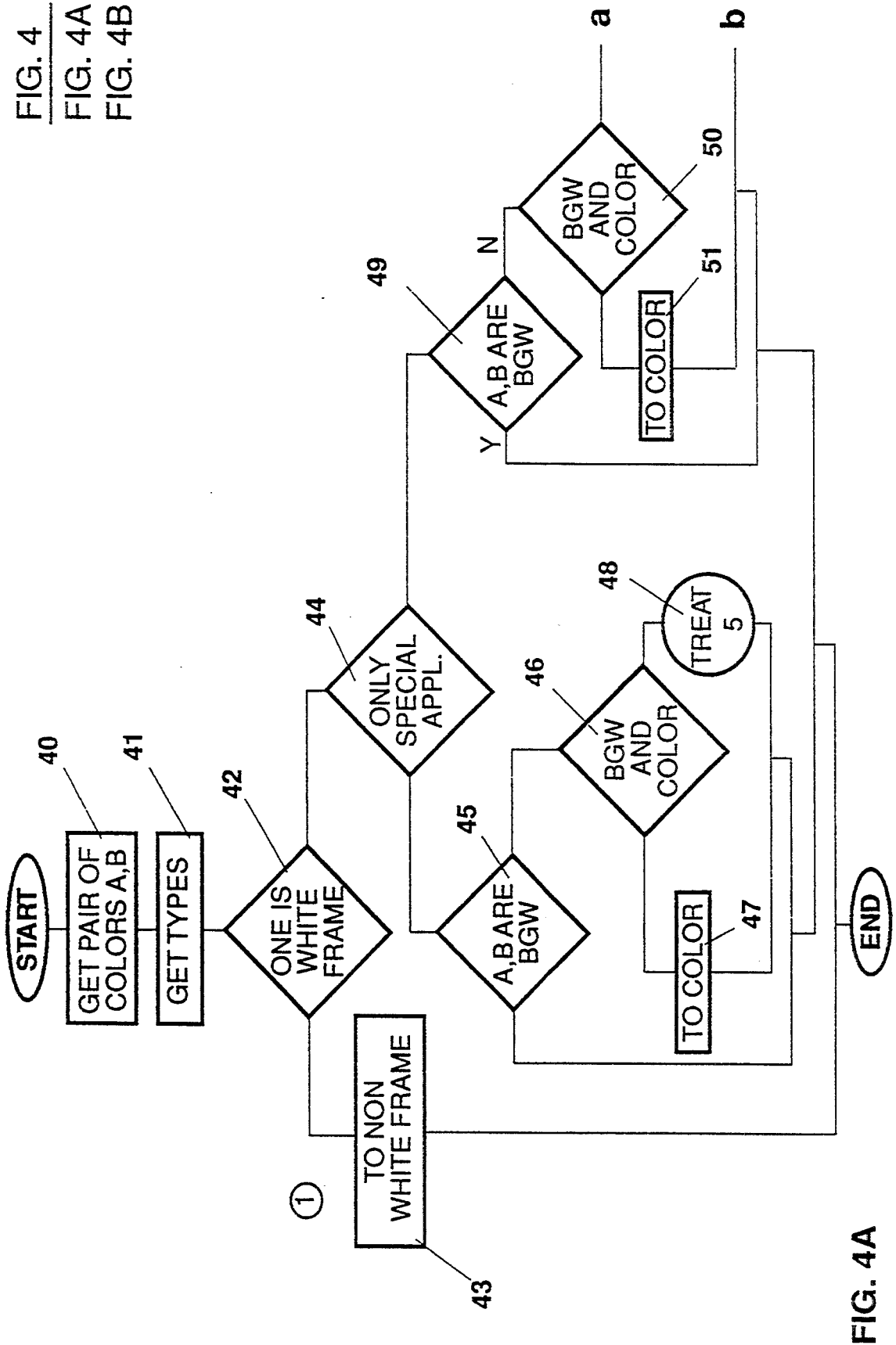
FIG. 4 is a flow chart illustrating the frame decision method in the flow chart of FIG. 3.
Figure 4B:
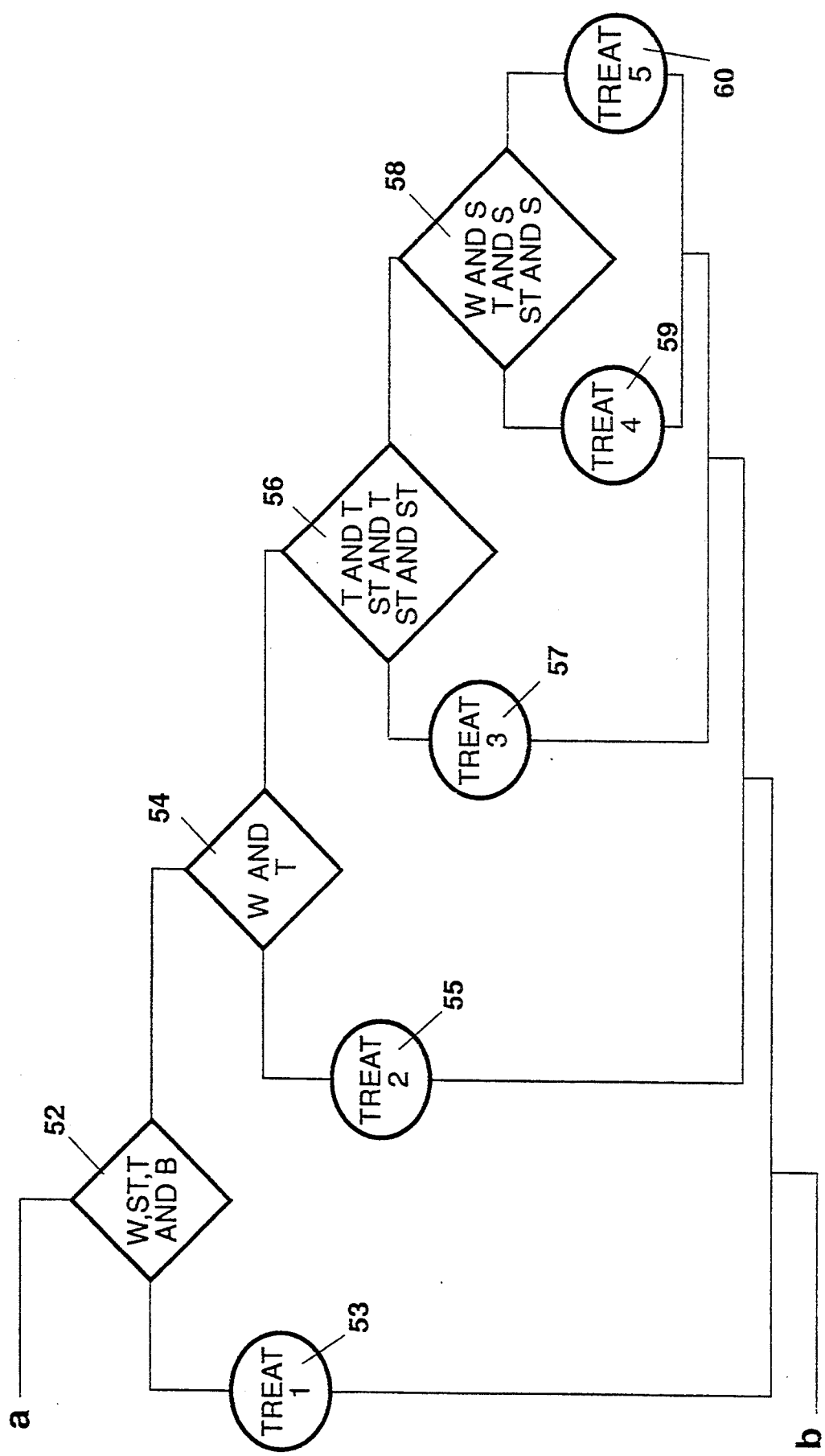

Table 2 is a list of conditions, each identified by a symbol, used in the frame decision flow charts, particularly in the flow charts of FIGS. 5–10 describing the various Treatments referred in the overall frame decision flow chart of FIG. 4. These conditions set forth in Table 2 are referred to in the Treatment flow charts of FIGS. 5–10, as described below.

Table 3 lists, by numbers 1–11, a set of instructions to be followed for determining the color separation values of the generated frame. These instructions appear in the frame decision flow chart of FIG. 4 and in the Treatment flow charts of FIGS. 5–10, and will also be referred to below in the description of the flow charts of FIGS. 4–10.

Overall Frame Decision Flow Chart

The overall frame decision process is illustrated in the flow chart of FIG. 4, whereas the various treatments involved in the frame decision identified as Treatments 1–5) are individually described in the flow charts of FIGS. 5–10. As indicated earlier, the frame decision performed by these flow charts is schematically illustrated by block 25 in the overall process flow chart of FIG. 3.

With reference to the frame decision flow chart illustrated in FIG. 4, the system first reads the color pair A,B (block 40) previously identified, and the area type (block 41) obtained from Table 1 discussed above, and then decides whether one color is a white frame (block 42). If yes, a decision is made to generate a frame in the direction of the non-white color (block 43).

If neither color pair is white, the system then checks to determine whether to frame only when a "special application" is involved, e.g., only special colors (block 44). If so, a check is made as to whether both colors are of the area type NBC (Background Base) of Table 1 (block 45), and if so, no frame is generated. If both colors of the color pair are not of the type NBC, a check is made whether the two colors are NBC and another color process or special process or special color. If so, a frame is generated in the direction of the second color (block 47); but if not, the system executes Treatment 5 (block 48), described below with respect to FIG. 10.

If a frame is required not only when a "special application" is involved (block 44), a check is made whether the two colors are of the NVC (Table 1) type (block 49); and if so, no frame is generated. However, if they are not both of this type, a check is made (block 50) whether one of the two colors is of the NBC type and the other is a special process color; and if so, a frame is generated (block 51) in the direction of the special or process color.

If the color pair does not include a color of the area type NBC and a special or process color (block 50), a check is made whether one color of the pair is black (K), and the other is of any of the area types W, ST or T, as define in Table 1 (block 52). If so, the system executes Treatment 1, described below with respect to the flow chart of FIG. 5.

If the decision in block 52 is negative, the system then checks to determine whether the two colors of the pair are of the type W and T, as defined in Table 1 (block 54); and if so, the system executes Treatment 2 (block 55), described below with respect to FIG. 6.

Figure 7B:
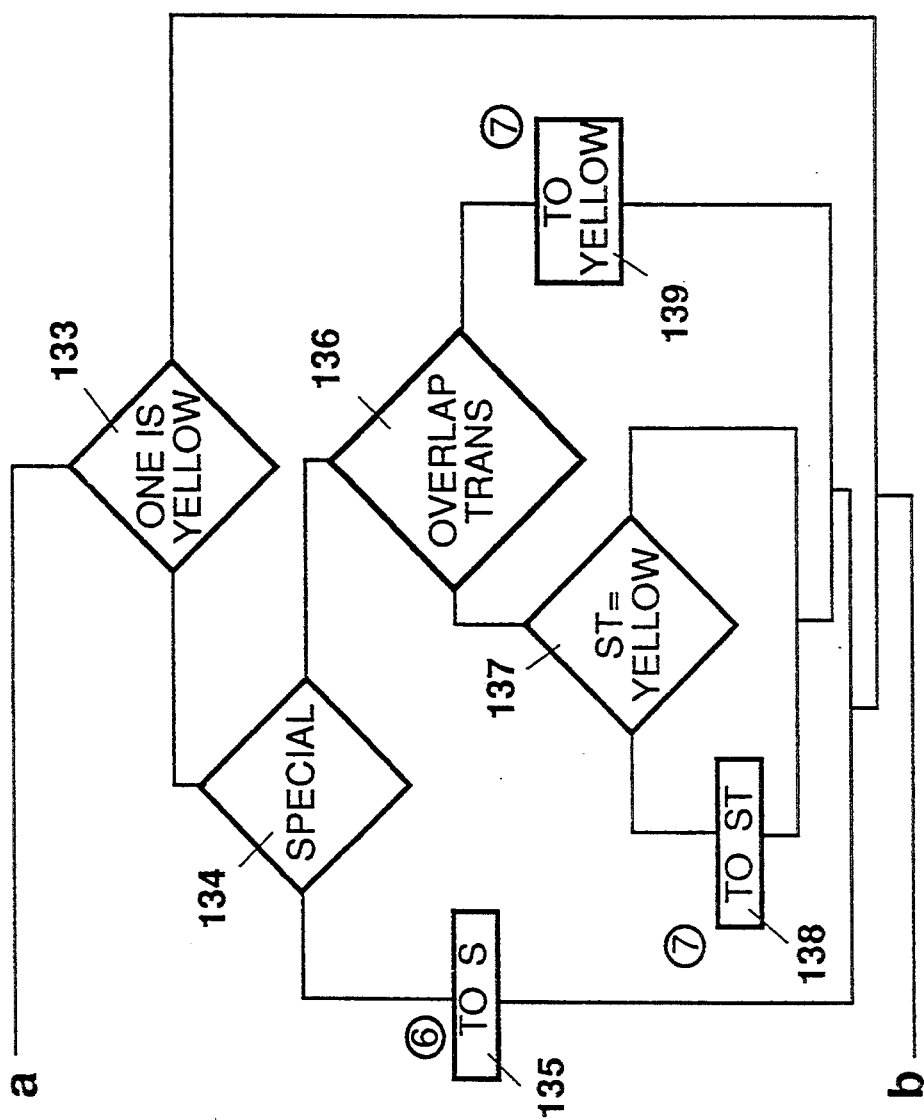

If the decision in block 54 is negative, the system then checks to determine whether the two colors of the pair are of the area types represented by any of the combinations specified in block 56; and if so, the system executes Treatment 3 illustrated in the flow chart of FIG. 7 (block 57).

Figure 8:
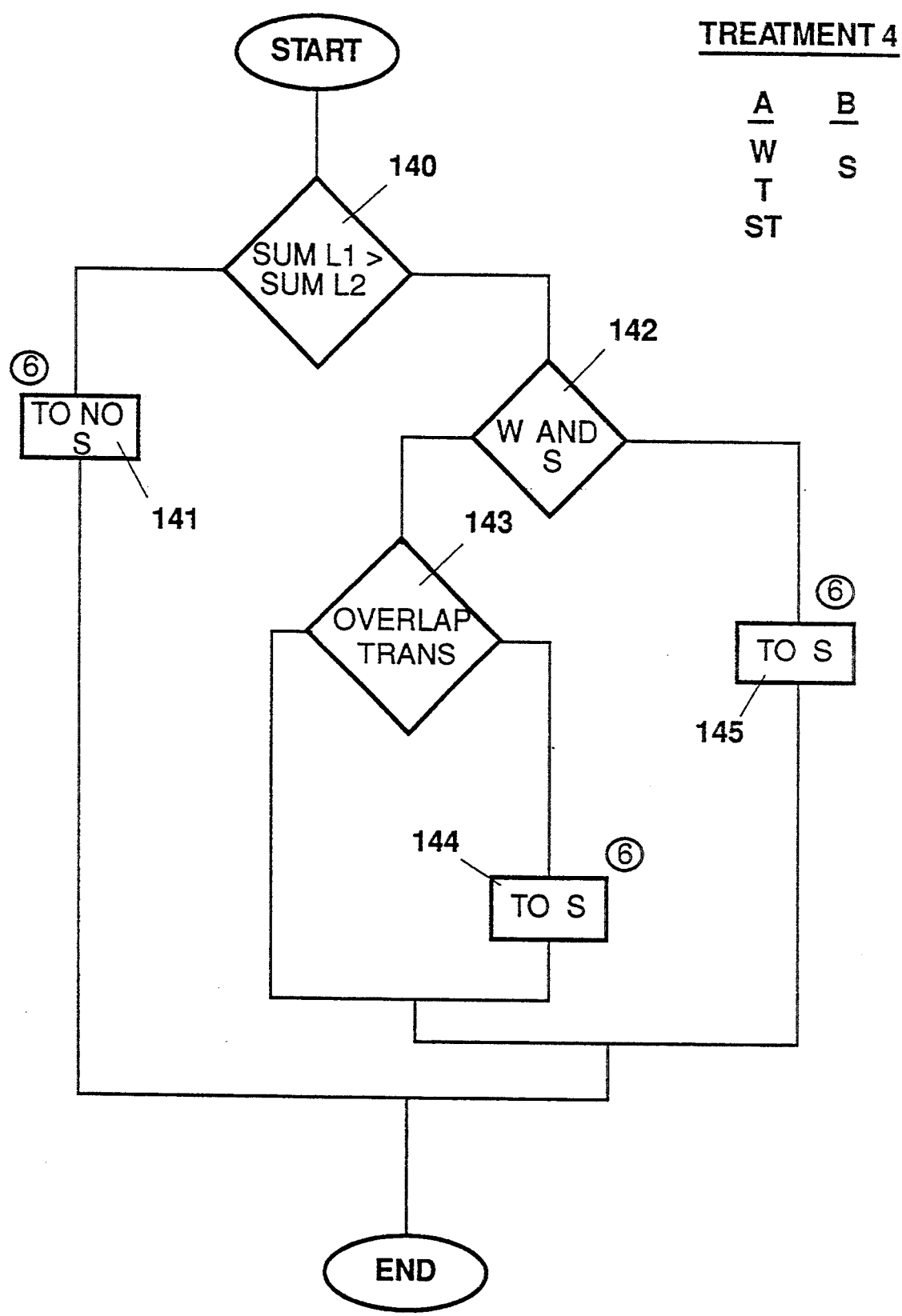
Figure 9:
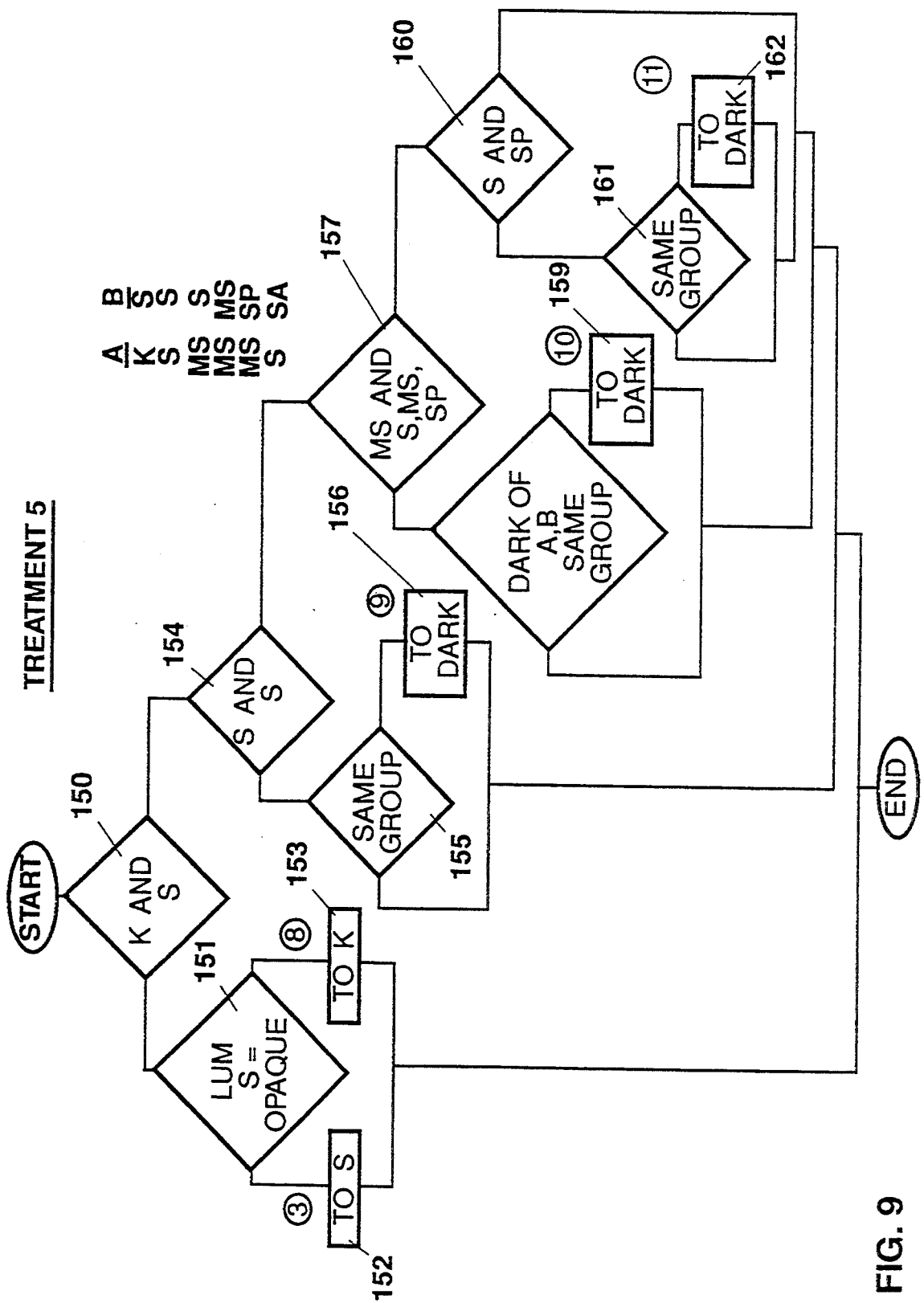

If the decision in block 56 is negative, the system then checks to determine whether the color pair is any of the combinations illustrated in block 58 of FIG. 4, and if so, the system executes Treatment 4 (block 59) illustrated by the flow chart of FIG. 8; and if not, it executes Treatment 5 (block 60) illustrated by the flow chart of FIG. 9.

Figure 5:
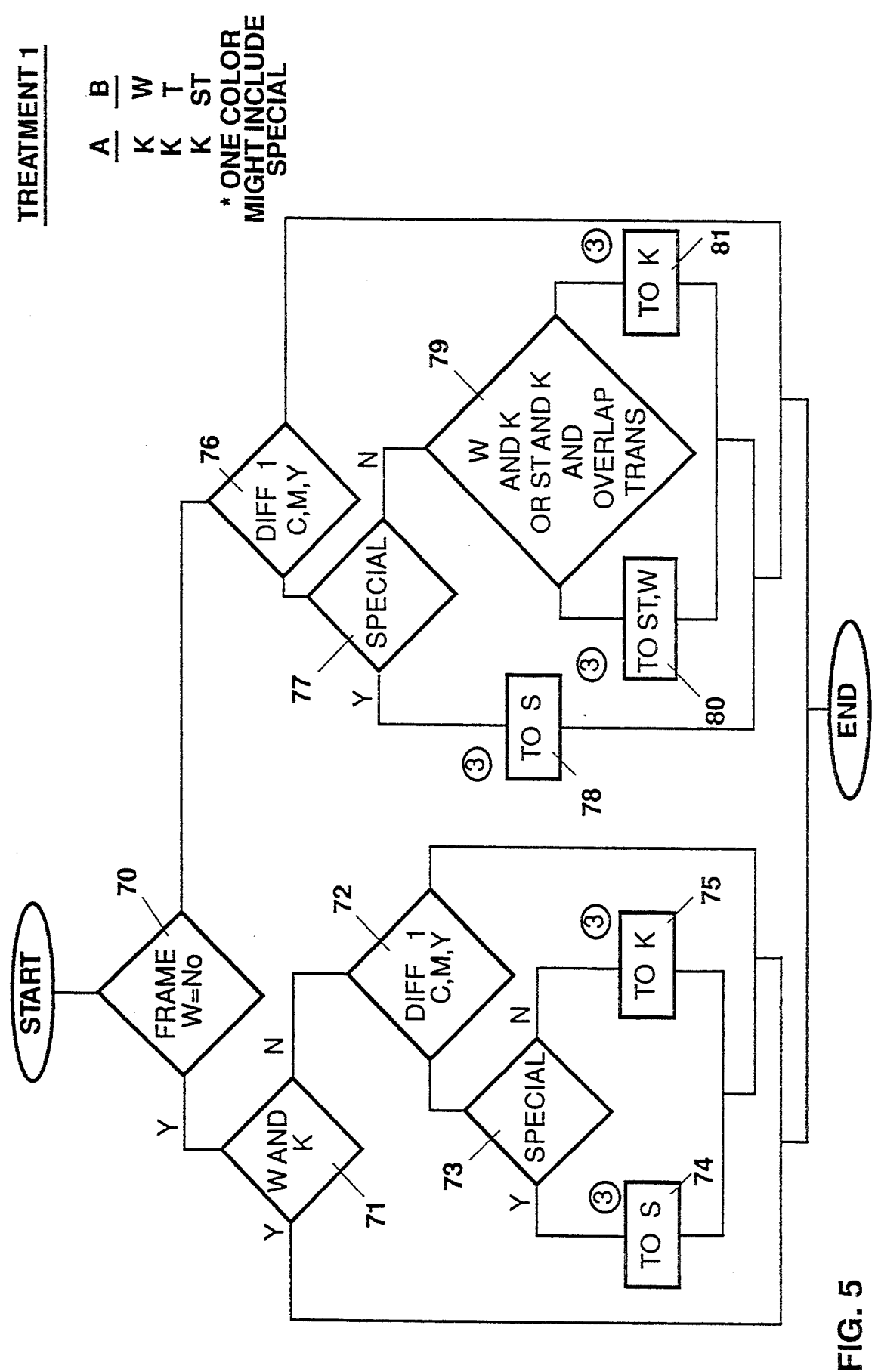
FIGS. 5-9 are flow charts illustrating Treatments 1-5, respectively, in the flow chart of FIG. 4.

Treatment 1 (FIG. 5)

The flow chart of FIG. 5 describes Treatment 1 as represented by block 53 in the frame decision flow chart of FIG. 4. As described there, this treatment is effected when one of the colors of the color pair is black (K), and the other is one of the area types W, T or ST, all as defined in Table 1. Treatment 1 is also effected when one of the two colors includes a special color.

In Treatment 1, a check is first made (block 70) as to whether it was predefined not to frame windows. If so, a check is made whether the other color is a W (window) (block 71). If so, no frame is generated.

However, if the check made in block 71 is negative, a check is made to determine whether the condition specified in block 72 is present, namely "DIFF 1 C, M, Y". This condition (first item in Table 2) is that at least one of the CMY separations differs significantly of one color element from the other color element according to a predetermined threshold, as preset by the operator. If this condition is found to be present, a check is made (block 73) whether one of the colors is a special color; and if so, a frame is generated according to instruction 3 of Table 3 in the direction of the special color (block 74). If one of the two colors checked by block 73 is not a special color, then a frame is generated according to instruction 3 of Table 3 in the direction of the black (block 75).

If the decision in block 70 is negative, (i.e., the operator had not instructed that the windows are not to be framed), a check is made (block 76), similar to the check made in block 72, namely whether at least one of the CMY separations of one color element differs significantly from that of the other color element. If so, a check is then made (block 77) whether one color is a special color; and if so, a frame is generated in the direction of the special color according to Instruction 3 in Table 3 (block 78).

If the decision in block 77 is negative, a check is made whether any of the conditions (of Table 2) set forth in block 79 is present. That is, the check is whether one color is of the W (window) area type and the other is black; or whether one color is K (black) and the color is of the area type ST (semi-tint), and the operator has inputted an instruction "Overlap Trans", namely a decision always to overlap color areas that contain a CT in one of their separations. If the decision in block 79 is positive, a frame is generated in the direction of the color area ST or W according to Instruction 3 of Table 3 (block 80); but if the decision in block 79 is negative, then a frame is generated in the direction of the black separation (block 81), also according to Instruction 3 of Table 3.

Figure 6:
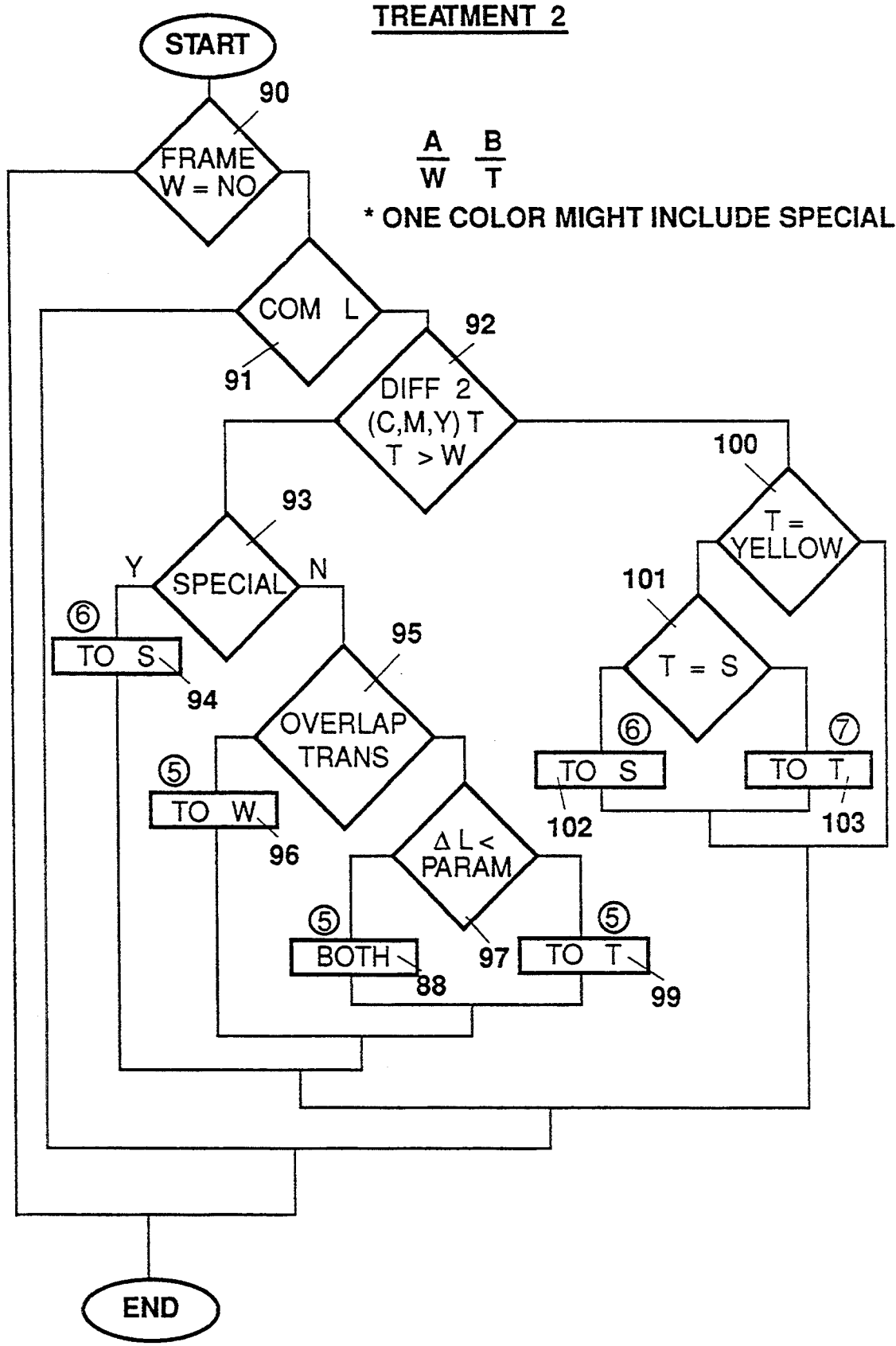

Treatment 2 (FIG. 6)

FIG. 6 is a flow chart of Treatment 2 which, as shown by block 55 in FIG. 4, is executed when the two colors of the pair are of the area types W (window) and T (tint), as more particularly defined in Table 1.

In executing Treatment 2, the system first checks whether the operator has inputted an instruction not to frame the window (block 90); if such an instruction has been inputted, no frame is generated.

If no such instruction has been inputted, the system checks for the condition "COM L" (block 91), namely whether the sum of the common luminance in the same separations between the bordering colors is high (i.e., above a predetermined threshold, as operator inputted). If so, no frame is generated.

If the decision in block 91 is negative, a decision is then made as to whether any of the conditions set forth in block 92 is present. These conditions are all defined in Table 2. If the decision in block 92 is positive, a check is made whether one of the colors is a special color (block 93), and if so a frame is generated in the direction of the special color according to Instruction 6 of Table 3 (block 94). If the decision in block 93 is negative, a check is made to determine whether the condition set forth in block 95 (as defined in Table 2 and also with respect to block 79, FIG. 5) is present; and if so, a frame is generated in the direction of the color element in area W (block 96) according to Instruction 5 of Table 3.

If the decision in block 95 is negative, a check is made to determine whether the condition set forth in block 97 (as defined in Table 2) is present, namely that the difference between the darkness of color-areas A,B is less than a predefined parameter (an operator inputted threshold); and if so, a frame is generated with respect to both colors of the pair, i.e., one-half frame for each color (block 98), according to Instruction 5 of Table 3. If the decision in block 97 is negative, a color frame is generated to the color identified as area T (tint, Table 1) also according to instruction 5 (block 99).

On the other hand, if the decision in block 92 is negative, a check is made whether the color area T (tint) is yellow, as defined in Table 2 (block 100). If yes, a check is made whether the color area T is a special color (block 101), and if so, a frame is generated in the direction of the special color (block 102) according to Instruction 6 of Table 3 if the tint is not a special color, then a frame is generated in the direction of the tint (block 103) according to Instruction 7 of Table 3 (block 103).

Treatment 3 (FIG. 7)

FIG. 7 illustrates the flow chart for executing Treatment 3 (namely block 57 in FIG. 4), when the two colors of the pair are both in are types T or ST. Treatment 3 is also followed when one color may be a special color.

Thus, the system first checks to determine whether both colors A, B are in area types ST (semi-tint, Table 1), as indicated by block 110. If so, a check is made to determine whether one of the colors is a special color (block 111), and if so, a frame is generated in the direction of the special color according to Instruction 6 of Table 3. If one of the colors is not a special color, no frame is generated.

If the decision in block 110 is negative, a check is made as to the presence of the condition set forth in block 113, namely whether the sum of the common luminance in the same separations between the bordering colors is above a predetermined threshold (Table 2). If yes, a check is made (block 114) whether one of the colors is yellow (according to Table 2); and if so, a check is then made to determine whether one of the colors is a special color (block 115). If one of the colors is indeed a special color, a frame is generated in the direction of the special color (block 116) according to Instruction 6 of Table 3.

If the check in block 115 is negative, a check is then made whether the condition set forth in block 117 is present, namely whether the operator has inputted an instruction to always overlap color areas that contain a CT in one of their-separations (Table 2). If so, a check is made (block 118) whether the color of area type ST (semi-tint) is yellow; and if so, a frame is generated in the direction of the color of area type ST (block 119) according to instruction 7 of Table 3. On the other hand, if the color of area type ST is not yellow, no frame is generated.

If the decision in block 117 is negative, i.e., no "OVERLAP TRANS" instruction had been operator inputted, a frame is generated to the yellow color (block 120) according to Instruction 7 in Table 3.

If the decision in block 113 is negative, (i.e., the sum of the common luminance in the same separations between the bordering colors was below a preset threshold), a check is made whether the condition set forth in block 121 is present, i.e., there are at least two separations which differ significantly in opposite directions (Table 2). If there is such a significant difference, a check is made in block 122 whether one of the colors is a special color; and if so, a frame is generated in the direction of the special color according to Instruction 6 of Table 3 (block 123).

On the other hand, if one of the colors is not a special (block 122), a decision is made as to whether the two colors are in the areas types ST and T (Table 1). If so, a check is made in block 125 whether there was an operator-inputted instruction "OVERLAP TRANS", namely always to overlap color areas that contain a CT in one of their separations. If so, a frame is generated in the direction of the color of area type ST according to Instruction 5 of Table 3 (block 126); but if the decision in block 125 was negative, a check is made to determine whether the condition set forth in block 127 (Table 2) is present. If such a condition is present, a frame is generated towards both colors, i.e., one-half frame for each color, according to Instruction 5 of Table 3 (block 128), but if the decision in block 127 is negative, a frame is generated in the direction of the dark color (per Table 2) also according to Instruction 5 of Table 3 (block 129).

If the check made in block 124 is negative, then the same procedure as described above with respect to blocks 127, 128 and 129 is followed, as indicated by blocks 130, 131 and 132, respectively.

If the decision in block 121 is negative (i.e., at least two separations do not differ significantly in opposite directions), a check is made (block 133) whether one of the two colors is of the area type yellow (per Table 2). If so, the same procedure as described above with respect to blocks 114–120 is followed, as shown by blocks 133–139.

Treatment 4 (FIG. 8)

FIG. 8 is a flow chart illustrating Treatment 4, namely block 59 in FIG. 4, wherein one of the colors is a special, and the other color is of the area type W,T or ST (as defined in Table 1).

In this treatment, a check is first made whether the sum of the luminances (i.e., overall darkness) of one color is greater than that of the other color (block 140). If so, a frame is generated towards the non-special color, according to Instruction 6 of Table 3 (block 141).

On the other hand, if the decision in block 140 is negative, a check is made (block 142) whether the two colors are of the window type (Table 1) and special. If so, and if the operator had inputted an "OVERLAP TRANS" instruction (Table 2) to always overlap color areas that contain a CT in one of their separations, no frame is generated; but if such an instruction had not been inputted, then a frame is generated in the direction of the special color according to Instruction 6 of Table 3 (block 144).

If the decision in block 142 is negative, then a frame is also generated in the direction of the special color according to Instruction 6 (block 145).

Treatment 5 (FIG. 9)

FIG. 9 is a flow chart of Treatment 5 represented by blocks 48 and 60 in the frame decision flow chart of FIG. 4. This treatment is executed whenever the two colors A,B of the color pair are any of the combinations listed at the top of FIG. 9.

Thus, a check is first made (block 150) whether the two colors are black (K) and a special color (S). If so, a check is made whether the condition specified in block 151 is present, namely whether the luminance of the special color is greater than the sum of the luminance of the color separations CMYK that have 100% (Table 2). If the decision in block 151 is positive, a frame is generated in the direction of the special color according to Instruction 3 of Table 3 (block 152), and if the decision is negative, a frame is generated in the direction of K (black) according to Instruction 8 of Table 3.

If the decision in block 150 is negative, a check is made whether the two colors are both special colors (block 154). If so, a check is made whether they are of the same color group (block 155), and if so, no frame is generated. Further, if the two special colors are not of the same group, the frame is generated in the direction of the darker color according to Instruction 9 of Table 3.

If the two colors are not both special colors, a check is made whether one of the colors is of area type MS, and the other is of any of the area types S,MS,SP, as defined in Table 1 (block 157). If the decision in block 157 is positive, a check is made whether the darkest separations of colors A and B are to be printed with the same ink (block 158, Table 2), and if so, no frame is generated; if not, however, a frame is generated in the direction of the darker color according to Instruction 10 of Table 3 (block 159).

If the check in block 157 is negative, a check is made whether the two colors are of the area type S and SP of Table 1 (block 160). If so, a check is made (block 161) whether they are of the same group, and if so no frame is generated; but if not, a frame is generated in the direction of the darker color (block 162), as defined by Table 2 and in accordance with Instruction 11 of Table 3.

Examples of Frame Decisions

Figure 10:
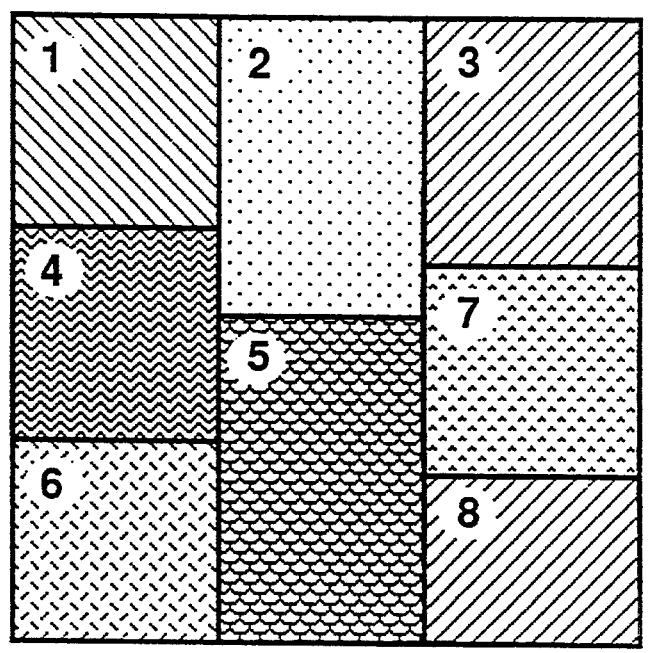
FIG. 10 illustrates several examples of border areas of different colors and involving the generation of frames.

FIG. 10 illustrates eight examples of bordering color elements 1–8 having color separation values according to Table 4 as set forth below. Besides the four process color separations CMYK, two special colors, such as gold and silver, are identified in the fifth and sixth separation layers. The values set forth describe the ink coverage percentages.

Figure 11:
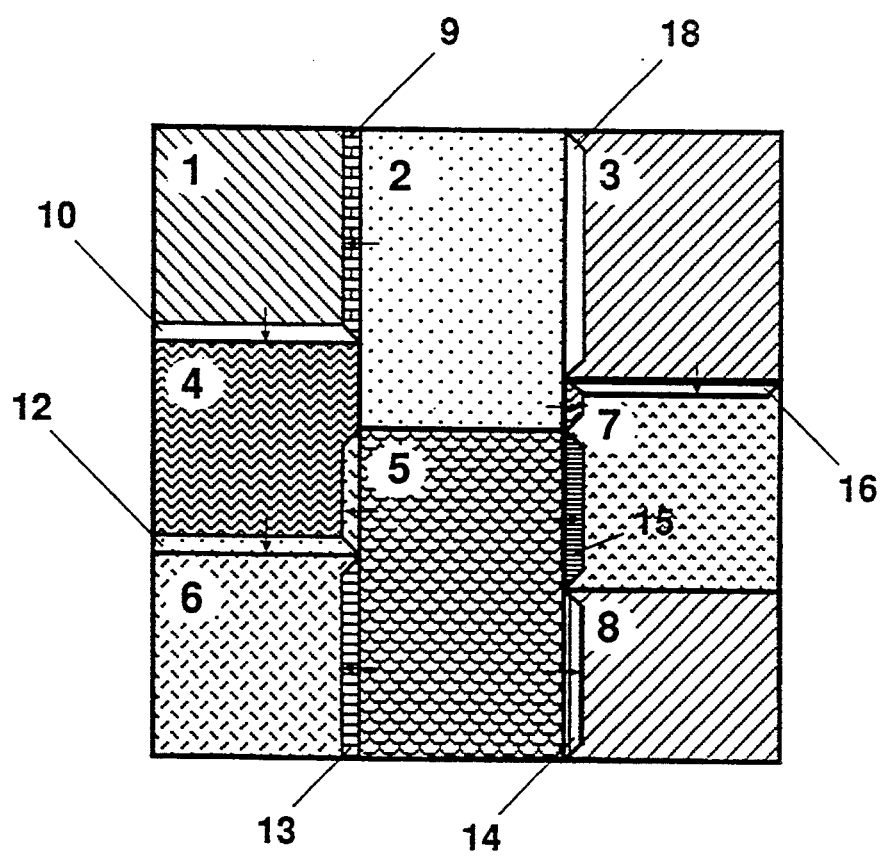
FIG. 11 illustrates the frames generated in the bordering areas illustrated in FIG. 10.

FIG. 11 illustrates the frames generated between the various color pairs according to the above-described flow charts. The color separation values of the generated frames are set forth in Table 5 below. Table 5 also sets forth the decision blocks in the above-described flow charts which determine the location and color separation values of the generated frames.

TABLE 4

|   | C | M | Y | K | 5th | 6th |
|---|---|---|---|---|-----|-----|
| 1 = | 0 | 50 | 100 | 0 | — | — |
| 2 = | 40 | 0 | 0 | 0 | — | — |
| 3 = | 60 | 0 | 0 | 100 | — | — |
| 4 = | 100 | 100 | 0 | 0 | — | — |
| 5 = | ct | ct | ct | ct | — | — |
| 6 = | — | — | — | — | 100 | — |
| 7 = | — | — | — | — | — | 100 |
| 8 = | — | — | — | — | 100 | 100 |

TABLE 5

|   | C | M | Y | K | 5th | 6th | Per Decision Box |
|---|---|---|---|---|-----|-----|------------------|
| #9 = | 25 | 50 | 100 | 0 | — | — | 132 |
| #10 = | 100 | 100 | 70 | 0 | — | — | 131 |
| #11 = | 100 | 100 | ct | ct | — | — | 99 |
| #12 = | 100 | 100 | 0 | 0 | 100 | — | 145 |
| #13 = | ct | ct | ct | ct | 100 | — | 144 |
| #14 = | ct | ct | ct | ct | 100 | 100 | 144 |
| #15 = | ct | ct | ct | ct | — | 100 | 144 |
| #16 = | 60 | 0 | 0 | 100 | — | 100 | 145 |
| #17 = | 40 | 0 | ct | 0 | — | 100 | 144 |
| #18 = | 40 | 0 | ct | 100 | — | 100 | 81 |

While the invention has been described with respect to one preferred embodiment, it will be appreciated that this is set forth purely for purposes of example, and that many other variations, modifications and applications of the invention may be made.

What is claimed is:

1. A method of processing a file of recorded color separation values of color elements in order to reduce or eliminate defects caused by misregistration in printing, comprising the steps of:
    identifying color pairs where there is a change in color between adjacent color areas in at least one color separation; and
    determining for each color pair, whether or not to make a frame, based on criteria including which ink is to be used in printing each color separation of the color pair.

2. A method according to claim 1, wherein for each color of the color pair, at least one color separation is a special color separation.

3. A method according to claim 1, wherein for one color of the color pair, at least one color separation is a special color separation, and for the other color of the color pair, at least one color separation is a process color separation.

4. A method according to claim 1, wherein for one color of the color pair, at least one color separation is a base color separation.

5. Apparatus for processing a file of recorded color separation values of color elements in order to reduce or eliminate defects caused by misregistration in printing, comprising:

means for identifying color pairs where there is a change in color between adjacent color areas in at least one color separation; and means for determining for each color pair, whether or not to make a frame, based on criteria including which ink is to be used in printing each color separation of the color pair.

6. Apparatus according to claim 5, wherein for each color of the color pair, at least one color separation is a special color separation.

7. Apparatus according to claim 5, wherein for one color of the color pair, at least one color separation is a special color separation, and for the other color of the color pair, at least one color separation is a process color separation.

8. Apparatus according to claim 5, wherein for one color of the color pair, at least one color separation is a base color separation.

* * * * *